United States Patent
Chern et al.

(10) Patent No.: US 6,386,856 B1
(45) Date of Patent: May 14, 2002

(54) MOLD ASSEMBLY

(76) Inventors: Ming-Dong Chern; Cheng-Ju Ho, both of 58, Ma Yuan West St., Taichung (TW)

(*) Notice: Subject to any disclaimer, the term of this patent is extended or adjusted under 35 U.S.C. 154(b) by 21 days.

(21) Appl. No.: 09/668,640

(22) Filed: Sep. 21, 2000

(51) Int. Cl.$^7$ .......................... B29C 65/02; B29C 65/70
(52) U.S. Cl. ..................... 425/501; 425/195; 425/503; 425/515
(58) Field of Search ................ 425/501, 503, 425/515, 195; 264/248; 156/292

(56) References Cited

U.S. PATENT DOCUMENTS

| | | | | |
|---|---|---|---|---|
| 1,575,388 A | * | 3/1926 | Roberts | 156/145 |
| 2,726,925 A | * | 12/1955 | Saulino | 156/118 |
| 3,343,218 A | * | 9/1967 | Borah | 425/195 |
| 3,825,457 A | * | 7/1974 | Holroyd et al. | 156/145 |
| 3,854,860 A | * | 12/1974 | Haag | 264/248 |
| 4,408,980 A | * | 10/1983 | Gallizia | 425/501 |
| 4,410,478 A | * | 10/1983 | Lindenmayer et al. | 264/248 |
| 4,714,421 A | * | 12/1987 | D'Agostino | 100/918 |
| 5,112,560 A | * | 5/1992 | Moumdjian | 12/146 M |
| 5,114,330 A | * | 5/1992 | Nielsen | 100/918 |

FOREIGN PATENT DOCUMENTS

JP   03230924 A   * 10/1991 ................ 425/501

* cited by examiner

Primary Examiner—Robert Davis

(57) ABSTRACT

A mold assembly has an upper positioning seat, an upper panel disposed in the upper positioning seat, a lower positioning seat, a lower panel disposed in the lower positioning seat, a first air cylinder disposed on a side of the lower positioning seat, a second air cylinder disposed on a bottom of the lower positioning seat, a third air cylinder disposed on a side of the upper positioning seat, and a fourth air cylinder disposed on a top portion of the upper positioning seat. A lower plate is disposed on a bottom of the upper panel. An upper plate is disposed on the lower panel. The lower plate engages with the upper plate.

1 Claim, 8 Drawing Sheets

MOLD ASSEMBLY

BACKGROUND OF THE INVENTION

The present invention relates to a mold assembly. More particularly, the present invention relates to a mold assembly which can form an inflated rubber product.

There are many types of molds to form cellular rubber cushions. However, it is cumbersome to assemble the conventional molds.

SUMMARY OF THE INVENTION

An object of the present invention is to provide a mold assembly which can form an inflated rubber product easily.

Accordingly, a mold assembly comprises an upper positioning seat, an upper panel disposed in the upper positioning seat, a lower positioning seat, a lower panel disposed in the lower positioning seat, a first air cylinder disposed on a side of the lower positioning seat, a second air cylinder disposed on a bottom of the lower positioning seat, a third air cylinder disposed on a side of the upper positioning seat, and a fourth air cylinder disposed on a top portion of the upper positioning seat. A lower plate is disposed on a bottom of the upper panel. An upper plate is disposed on the lower panel. The lower plate engages with the upper plate. The lower plate has a first male mold and a first female mold. The upper plate has a second male mold and a second female mold. The upper positioning seat has two slide grooves receiving two laterals of the upper panel. The lower positioning seat has two slide recesses receiving two laterals of the lower panel. The first male mold matches the second male mold and the second female mold. The first female mold matches the second male mold and the second female mold. An air inlet rubber valve is connected to the first female mold. A blowing device is connected to the air inlet rubber valve.

DETAILED DESCRIPTION OF THE INVENTION

Figure 1:
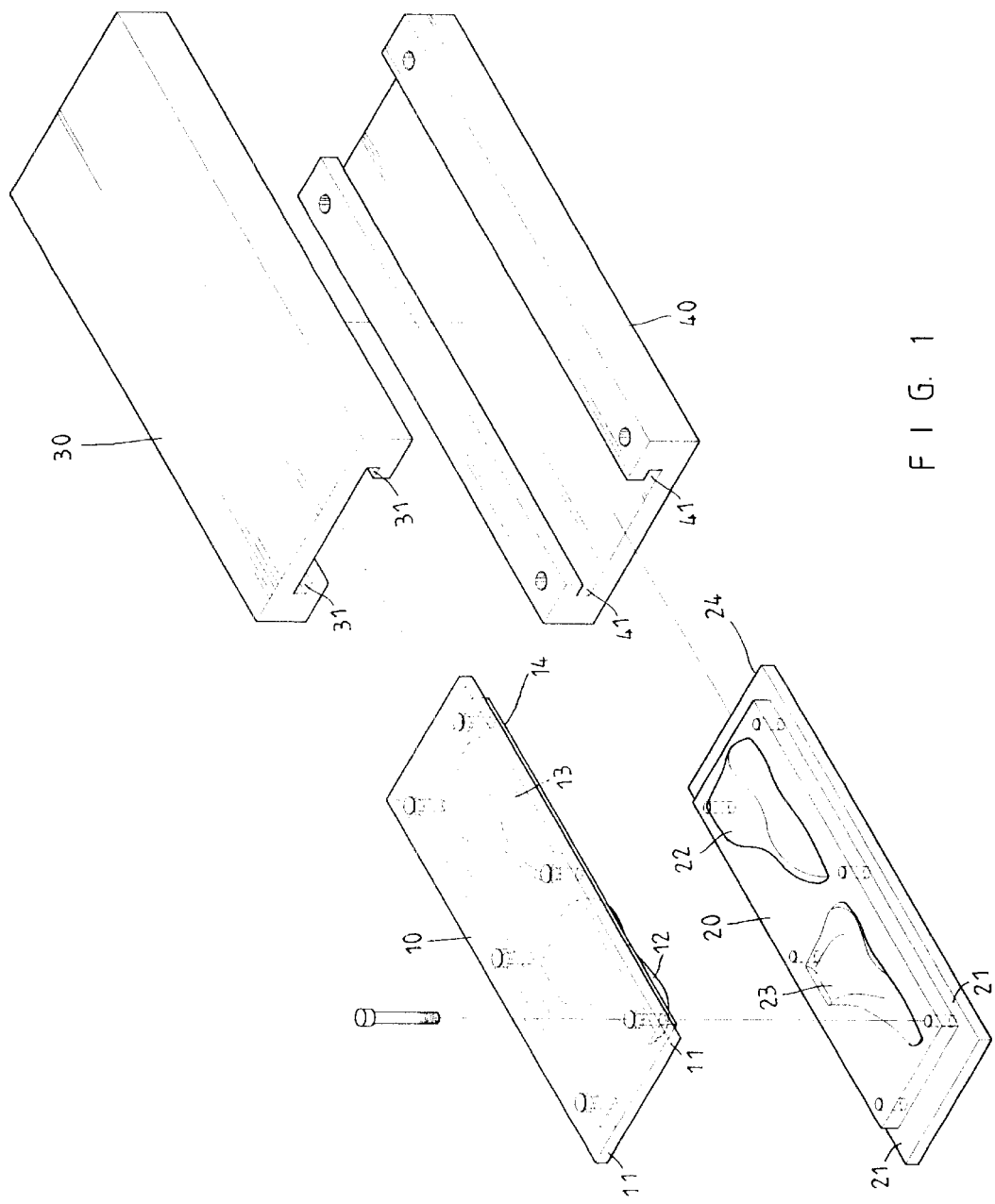
FIG. 1 is a partially perspective exploded view of a mold assembly of a preferred embodiment in accordance with the present invention.
Figure 2:
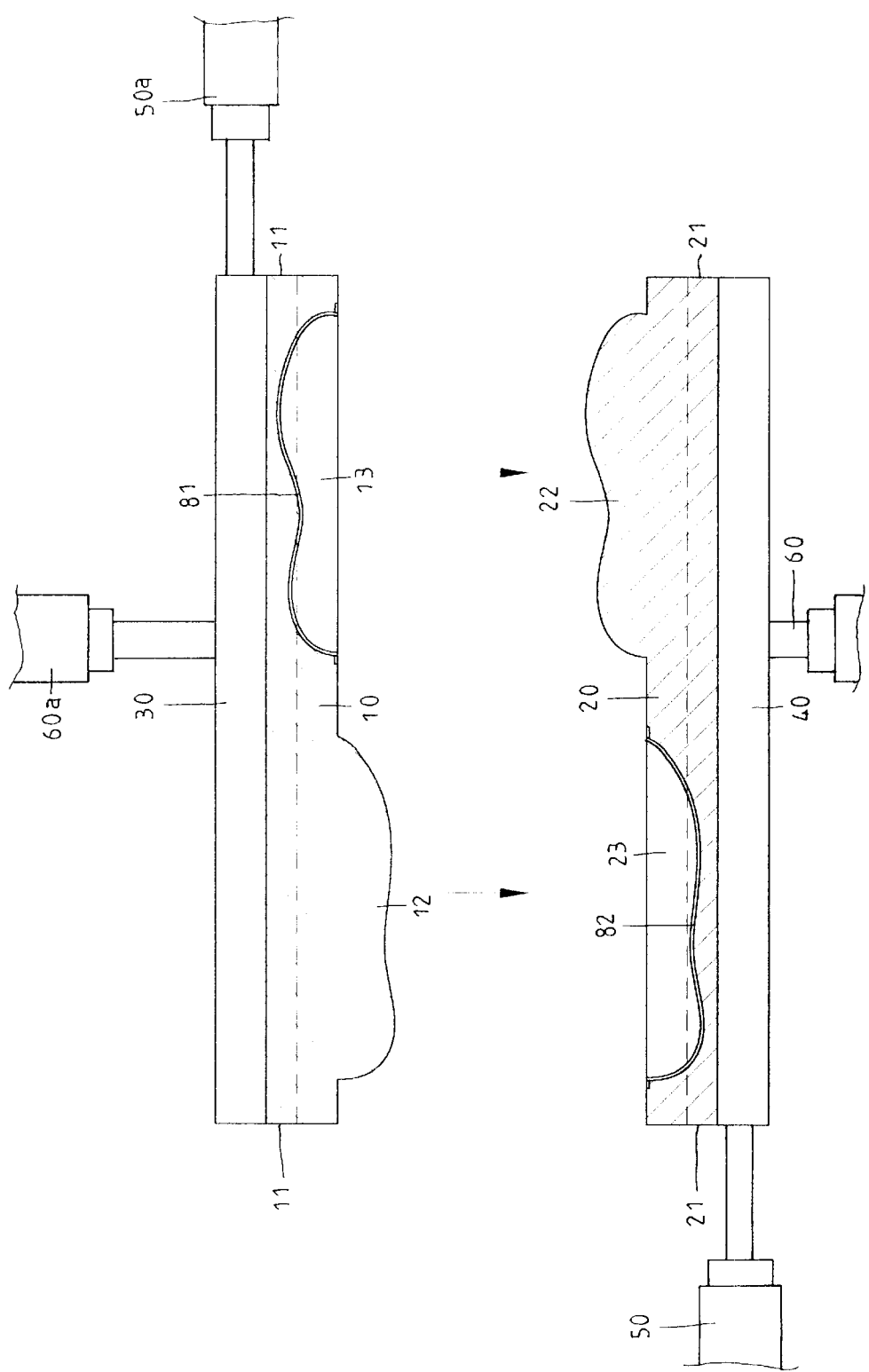
FIG. 2 is a sectional view of a mold assembly of a preferred embodiment in accordance with the present invention.
Figure 3:
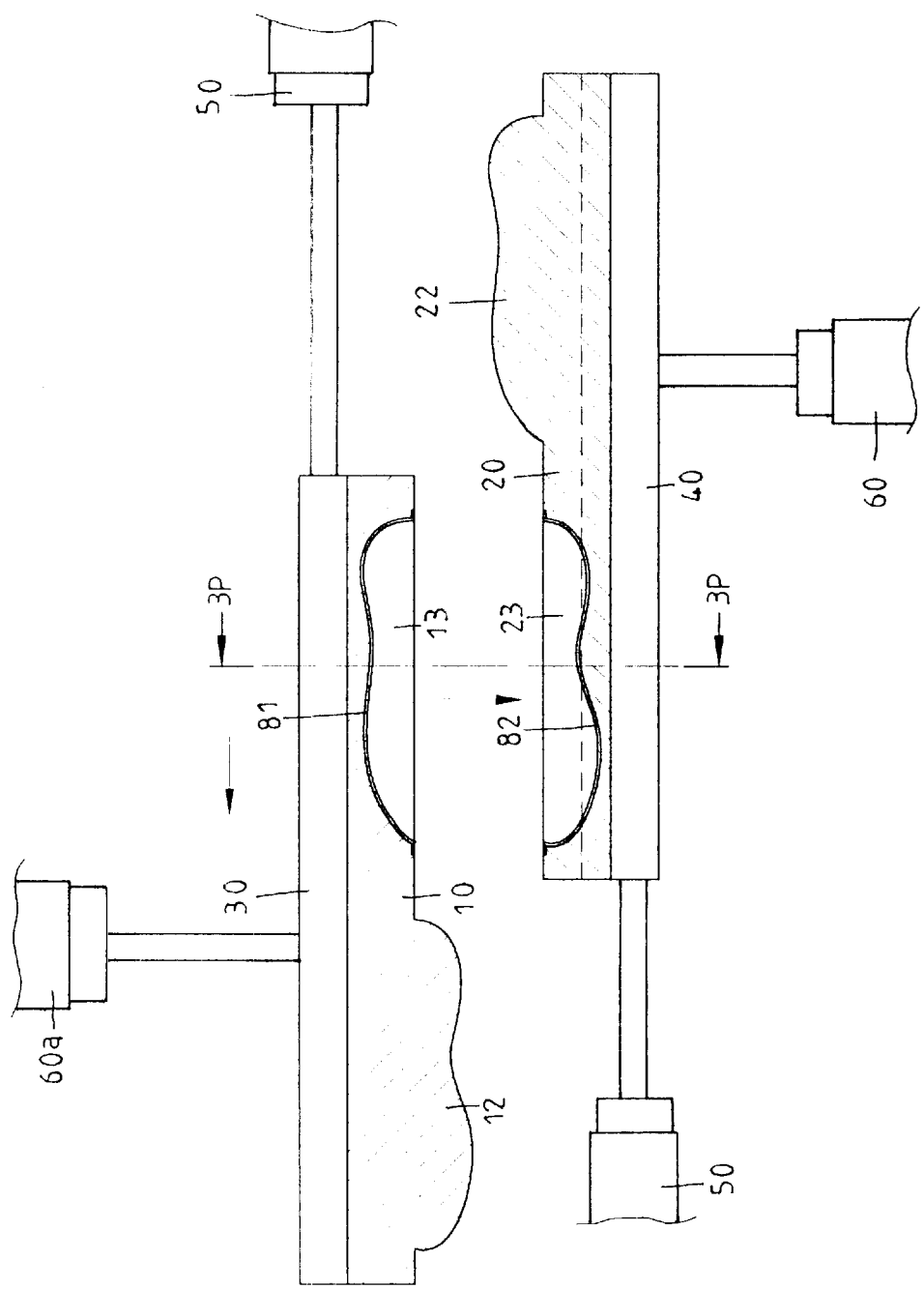
FIG. 3 is another sectional view of a mold assembly of a preferred embodiment in accordance with the present invention.
Figure 3A:
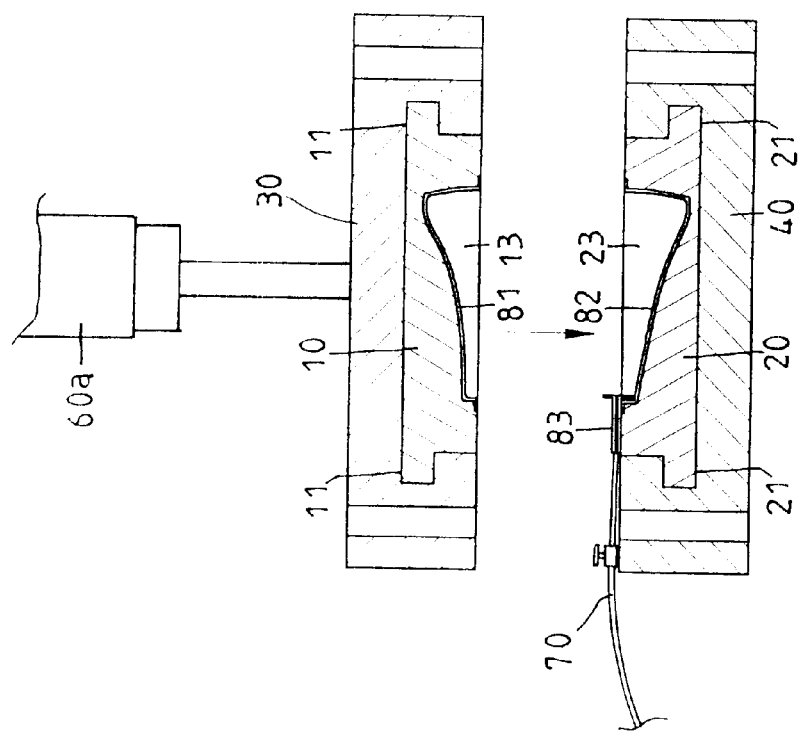
FIG. 3A is a sectional view taken along line 3P—3P in FIG. 3.

Referring to FIGS. 1 to 3A, a mold assembly comprises an upper positioning seat 30, an upper panel 10 disposed in the upper positioning seat 30, a lower positioning seat 40, a lower panel 24 disposed in the lower positioning seat 40, a first air cylinder 50 disposed on a side of the lower positioning seat 40, a second air cylinder 60 disposed on a bottom of the lower positioning seat 40, a third air cylinder 50a disposed on a side of the upper positioning seat 30, and a fourth air cylinder 60a disposed on a top portion of the upper positioning seat 30.

A lower plate 14 is disposed on a bottom of the upper panel 10.

An upper plate 20 is disposed on the lower panel 24.

The lower plate 14 engages with the upper plate 20.

The lower plate 14 has a first male mold 22 and a first female mold 23.

The upper plate 20 has a second male mold 12 and a second female mold 13.

The upper positioning seat 30 has two slide grooves 31 receiving two laterals 11 of the upper panel 10.

The lower positioning seat 40 has two two slide recesses 41 receiving two laterals 21 of the lower panel 24.

The first male mold 22 matches the second male mold 12 and the second female mold 13.

The first female mold 23 matches the second male mold 12 and the second female mold 13.

An air inlet rubber valve 83 is connected to the first female mold 23.

A blowing device 70 is connected to the air inlet rubber valve 83.

When the first male mold 22 engages with the second female mold 13 and the first female mold 23 engages with the second male mold 12, a first semi-finished product 82 is formed in the first female mold 23 and a second semi-finished product 81 is formed in the second female mold 13.

When the female mold 13 engages with the first female mold 23, the first semi-finished product 82 couples with the second semi-finished product 81. The air inlet rubber valve 83 is inserted in the first semi-finished product 82. A hot air passes through the blowing device 70 and the air inlet rubber valve 83 into the first semi-finished product 82. Then the first semi-finished product 82 and the second semi-finished product 81 forms a cushion product.

Figure 4:
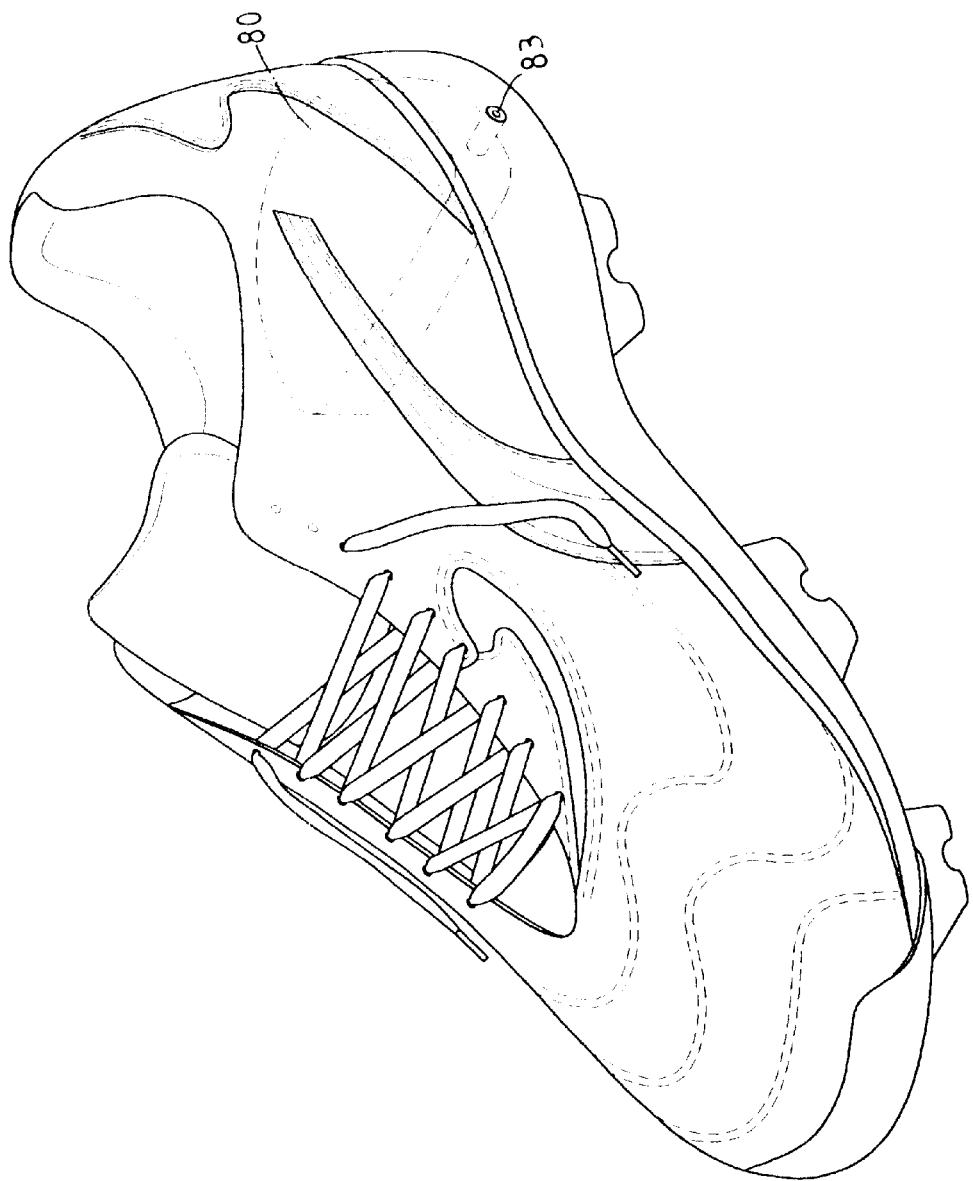
FIG. 4 is a perspective view illustrating a cushion product of a preferred embodiment disposed in a shoe.

Referring to FIG. 4, the cushion product 80 is disposed in a shoe. The air inlet rubber valve 83 is inserted in the cushion product 80.

Figure 5:
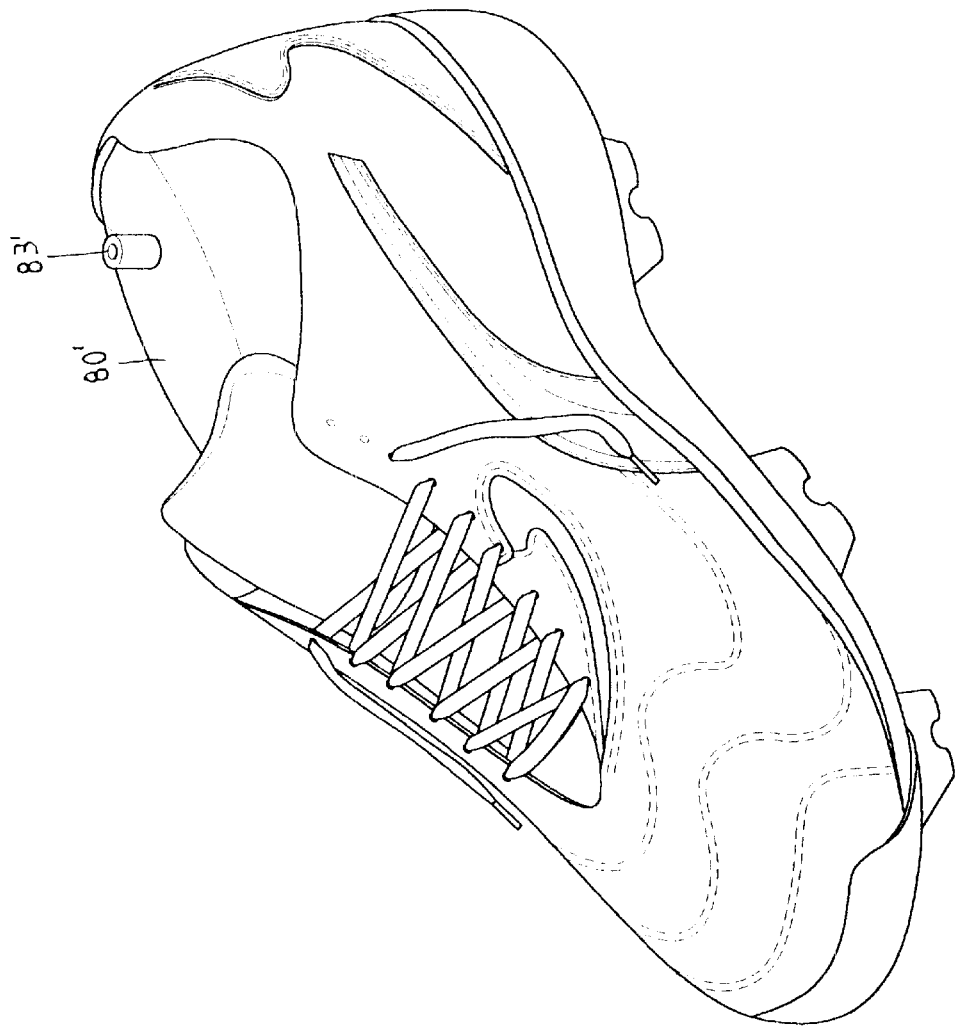
FIG. 5 is a perspective view illustrating a rubber last disposed in a shoe.
Figure 6:
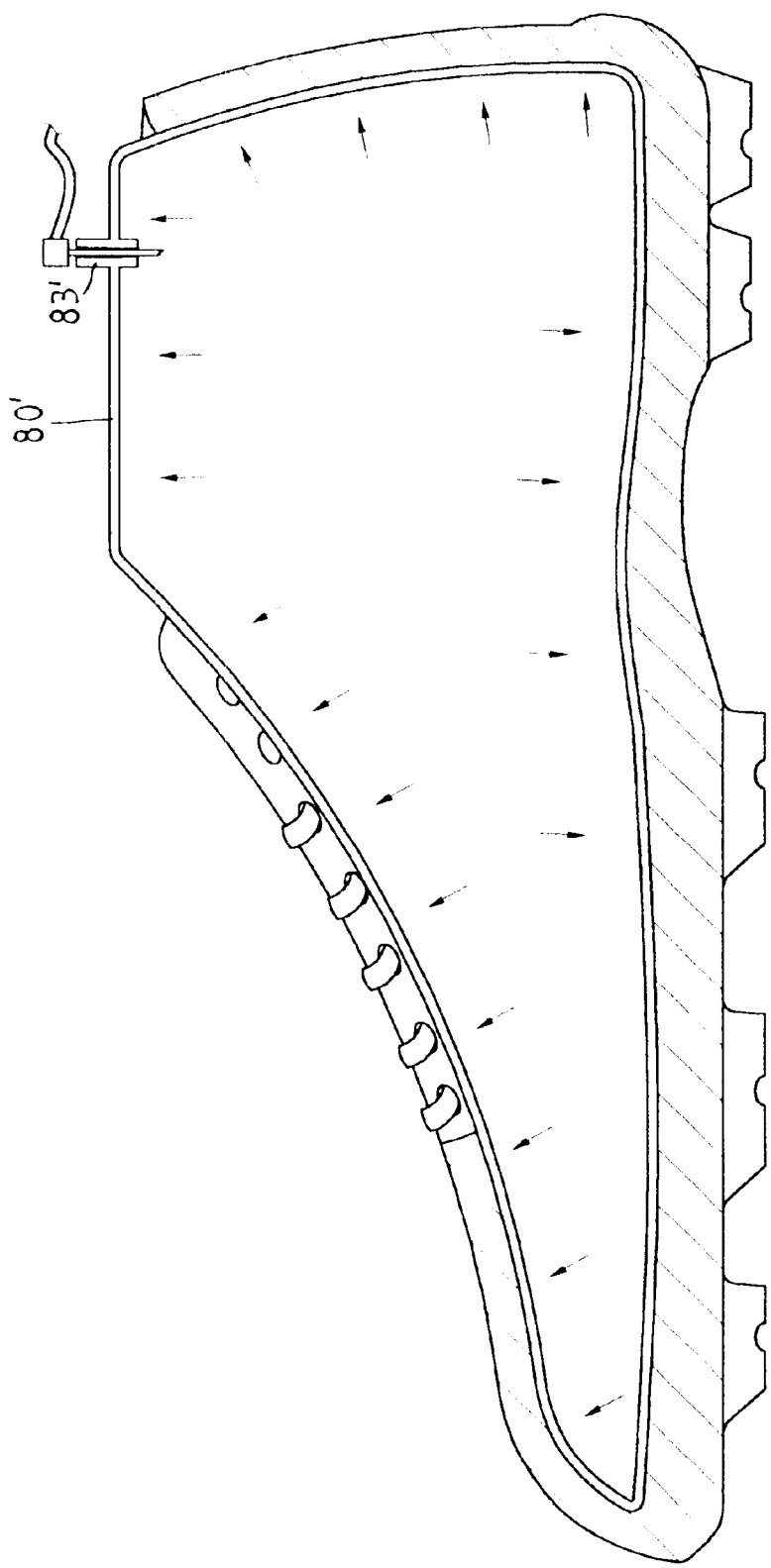
FIG. 6 is a sectional view illustrating a rubber last disposed in a shoe.

Referring to FIGS. 5 and 6, a last product 80' is disposed in a shoe. An air inlet rubber valve 83' is inserted in the last product 80'.

Figure 7:
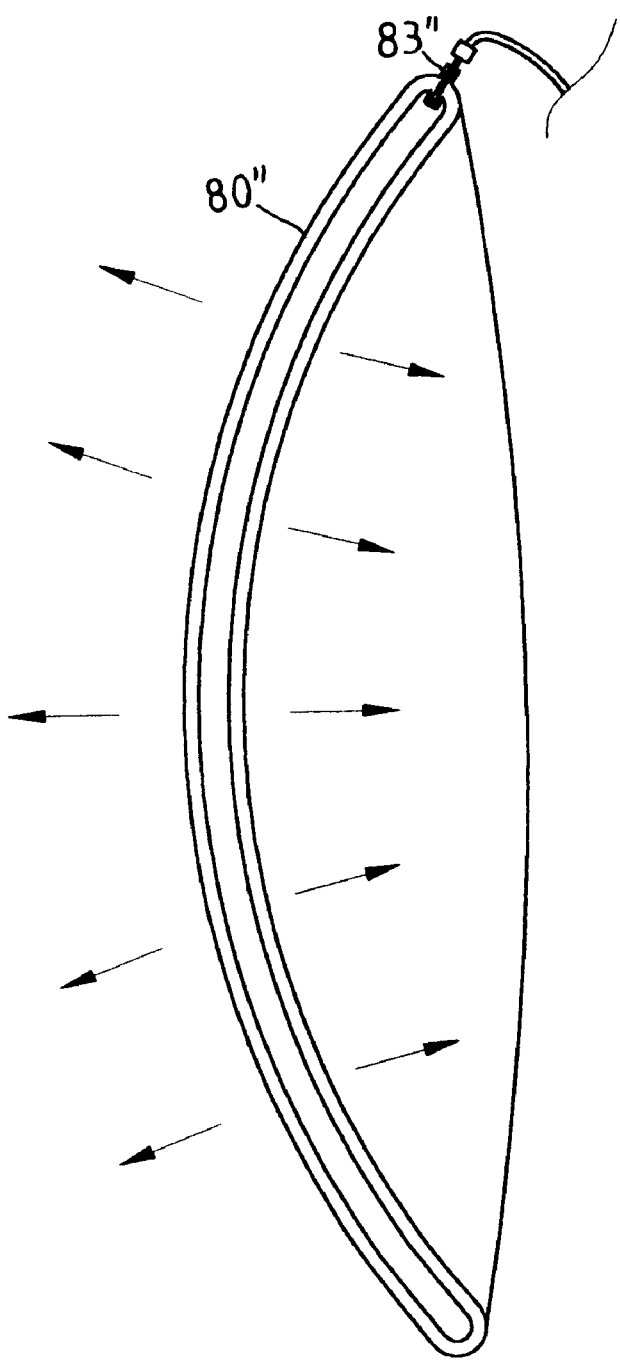
FIG. 7 is a perspective view is a cushion product of a preferred embodiment which can be disposed in a brassiere.

Referring to FIG. 7, a cushion product 80" is disposed in a brassiere. An air inlet rubber valve 83" is inserted in the cushion product 80".

The invention is not limited to the above embodiment but various modification thereof may be made. Further, various changes in form and detail may be made without departing from the scope of the invention.

We claim:

1. A mold assembly comprises:
    an upper positioning seat, an upper panel disposed in the upper positioning seat, a lower positioning seat, a lower panel disposed in the lower positioning seat, a first air cylinder disposed on a side of the lower positioning seat, a second air cylinder disposed on a bottom of the lower positioning seat, a third air cylinder disposed on a side of the upper positioning seat, and a fourth air cylinder disposed on a top portion of the upper positioning seat,
    a lower plate disposed on a bottom of the upper panel,
    an upper plate disposed on the lower panel, the lower plate engaging with the upper plate, the lower plate having a first male mold and a first female mold, the upper plate having a second male mold and a second female mold, the upper positioning seat having two slide grooves receiving two laterals of the upper panel, the lower positioning seat having two slide recesses receiving two laterals of the lower panel, the first male mold matching the second male mold and the second female mold, the first female mold matching the second male mold and the second female mold, an air inlet rubber valve connected to the first female mold, and a blowing device connected to the air inlet rubber valve.

* * * * *